(12) United States Patent
Bar-Yoav

(10) Patent No.: US 9,712,672 B2
(45) Date of Patent: Jul. 18, 2017

(54) CALL RESPONSE SYSTEM

(75) Inventor: Ronen Bar-Yoav, Moshav Geulim (IL)

(73) Assignee: Avaya Inc., Basking Ridge, NJ (US)

( * ) Notice: Subject to any disclaimer, the term of this patent is extended or adjusted under 35 U.S.C. 154(b) by 1656 days.

(21) Appl. No.: 12/572,015

(22) Filed: Oct. 1, 2009

(65) Prior Publication Data

US 2011/0081007 A1  Apr. 7, 2011

(51) Int. Cl.
*H04M 3/50* (2006.01)
*H04L 12/58* (2006.01)

(52) U.S. Cl.
CPC ........... *H04M 3/50* (2013.01); *H04L 12/587* (2013.01); *H04L 51/24* (2013.01); *H04M 2203/4509* (2013.01)

(58) Field of Classification Search
CPC .. H04M 3/432; H04M 3/436; H04M 3/53383; H04M 3/487
USPC ...................................... 379/88.13
See application file for complete search history.

(56) References Cited

U.S. PATENT DOCUMENTS

| | | |
|---|---|---|
| 6,018,671 A | 1/2000 | Bremer |
| 6,404,860 B1 | 6/2002 | Casellini |
| 6,741,678 B2 | 5/2004 | Cannell et al. |
| 6,823,184 B1 | 11/2004 | Nelson |
| 6,850,604 B2 | 2/2005 | Cannell et al. |
| 6,950,503 B2 * | 9/2005 | Schwartz ............... H04L 29/06 370/409 |
| 7,106,852 B1 | 9/2006 | Nelson et al. |
| 7,123,707 B1 | 10/2006 | Hiri et al. |
| 7,133,504 B2 | 11/2006 | Fostick |
| 7,136,462 B2 | 11/2006 | Pelaez et al. |
| 7,213,073 B1 | 5/2007 | Slavin |
| 7,224,774 B1 | 5/2007 | Brown et al. |
| 7,266,190 B1 * | 9/2007 | Mullis ................... H04M 3/436 379/210.02 |
| 7,272,563 B2 | 9/2007 | Nelson |
| 7,286,649 B1 | 10/2007 | Nelson et al. |
| 7,305,068 B2 | 12/2007 | Tucker et al. |
| 7,305,075 B2 | 12/2007 | Harris |
| 7,313,228 B1 | 12/2007 | Sorice et al. |
| 2007/0121901 A1 | 5/2007 | Mathal et al. |

FOREIGN PATENT DOCUMENTS

WO  2004/088854 A2  10/2004
WO  2008/102365 A2  8/2008

* cited by examiner

*Primary Examiner* — Amal Zenati
(74) *Attorney, Agent, or Firm* — Sheridan Ross P.C.

(57) ABSTRACT

A Call Response System comprising modules that are mutually interfaced for sharing parameters. Firstly, a data-collection module, for collecting parameters of an incoming call and of a recipient for the incoming call. Secondly, a dynamic-scripting module for configuring a response scenario according to prioritized combinations of the parameters and for substituting a component for at least one respective open variable within the configured scenario. Finally, a call-response module for transmitting aspects of the component substituted configured scenario, and for recording aspects of the transmitted scenario.

17 Claims, 2 Drawing Sheets

CALL RESPONSE SYSTEM

TECHNICAL FIELD

The present specification generally relates to user application packages for managing incoming telephone communications. More specifically, the present specification relates to an almost noninvasive user interface protocol for managing incoming telephone communications.

BACKGROUND ART

There is a longstanding general problem of providing proper management tools for incoming telephone communications, which has become more complicated as the basic telecommunications contents expanded. Starting originally with voice only communications, this media first grew to include wire-photo, facsimile, and teletext; and more recently has grown to include Short Message Service (SMS), streaming video, email, and the like. Also, there are a growing number of applications that are installed on end-user phone devices, and particularly on cellular phones; for instance, time management applications like calendar, location identifiers like a GPS. Often, these applications are not linked directly to the intra-personal communication activity that the phone device provides; and therefore are not employed to enhance intelligent communication using the device. Over the years, other types of applications have also come to accommodation with the telephone media, including electronic funds transfer, secure data transfer protocols, Internet, and the like. Simultaneously, telephone service providers have diversified their facilities to allow call forwarding, voice messaging, conference calls, and the like.

Now, since it has become apparent that there are many different classes of "typical" telephone users, numerous service convergence configurations have been proposed, developed, tested, and even standardized. Nevertheless, users often remain challenged by the complexity of these configurations, while telecommunication service providers remain committed to find convenient facile interfaces for these often frustrated users.

More specifically, there remains a large measure of user resistance to new interfaces because of a long history of frustrations with getting "service" packages to actually allow the user to configure and/or manage desired services. Thus, on the one hand, there are many service interface combinations that are known; even if few of these have overcome the invisible barriers to popular use; and on the other hand, the "magic" combination of convergence and interface has remained a far from obvious mystery.

Typically, "Coverage" features (e.g. on-busy transfer to voice mail or to an alternate extension) are standard features available today. However, these capabilities are static; in that they revert to a minimum variability fixed-template behavior-response to all callers; as pre-defined in the system. Today's systems typically only offer coarse-resolution "decisions" between Busy vs. No Answer, between internal vs. external calls, or the like; which hardly exploit the intelligence capabilities of convergence combinations.

We will now list a few of the many telephone communications convergence combinations which have suggested user interface management protocols to help a user deal with multiple conflicting incoming content items. From this, one can appreciate that there are many technical features which have to come into compliance in order for a package to actually operate at a reasonable level of reliability. This, in turn, has transformed the grand theoretical "Unified Communications" domain of telephony convergence into an endlessly-fragmented sparsely-populated map of trials and errors; finding specific niche markets while generally missing the mainstream.

U.S. Pat. No. 7,313,228 Dynamic call processing control;
U.S. Pat. No. 7,305,075 Telephone call messaging device;
U.S. Pat. No. 7,305,068 Telephone communication with silent response feature;
U.S. Pat. No. 7,286,649 Telecommunications infrastructure for generating conversation utterances to a remote listener in response to a quiet selection;
U.S. Pat. No. 7,272,563 Personal computer and scanner for generating conversation utterances to a remote listener in response to a quiet selection;
U.S. Pat. No. 7,266,190 System and method for managing communications;
U.S. Pat. No. 7,224,774 Real-time call control system;
U.S. Pat. No. 7,213,073 Call management system;
U.S. Pat. No. 7,136,462 Network speech-to-text conversion and store;
U.S. Pat. No. 7,133,504 Non-voice completion of voice calls;
U.S. Pat. No. 7,123,707 Methods of controlling communications with at least two calling party devices by a user of a called party device;
U.S. Pat. No. 7,106,852 Telephone accessory for generating conversation utterances to a remote listener in response to a quiet selection;
U.S. Pat. No. 6,950,503 Method and system for facilitating mediated communication;
U.S. Pat. No. 6,853,710 Telephone call messaging device;
U.S. Pat. No. 6,850,604 Method and system for sending a data message to a calling phone while communicating with a first phone;
U.S. Pat. No. 6,823,184 Personal digital assistant for generating conversation utterances to a remote listener in response to a quiet selection;
U.S. Pat. No. 6,741,678 Method and system for sending a data response from a called phone to a calling phone;
U.S. Pat. No. 6,404,860 System and method for internet call management with text-to-speech messaging;
U.S. Pat. No. 6,018,671 Silent call accept;
PCT/IL2008/000236 (WO 2008/102365) System and method for telephone communication;
20070121901 Providing answering message options for answering calls; and
WO/2004/088854 Apparatus, system, and method for providing silently selectable audible communication.

Typically, what one comes to appreciate after reviewing so many sort-of similar patents is that there remains a clear need in telecommunications, but that the special narrow combination of features and interfaces is far from obvious to the man of the art.

Summarizing, in a critical aspect, the problem is to provide facile user-simple means of fast non-disruptive call handling for incoming calls, which meets the actual needs of the ordinary user.

SUMMARY OF EMBODIMENTS

The aforesaid longstanding needs are significantly addressed by embodiments which specifically relate to a call response system of fast non-disruptive call handling for incoming calls. These instant embodiments relate to "A Call Response System" comprising (A) a data-collection module for collecting parameters (i) of an incoming call and (ii) of a recipient for the incoming call; (B) interfaced with the data collection module, a dynamic-scripting module (i) for configuring a response scenario according to prioritized combinations of the parameters and (ii) for substituting a component for at least one respective open variable within the configured scenario; and (C) interfaced with the dynamic-scripting module, a call-response module (i) for transmitting aspects of the component substituted configured scenario and (ii) for recording aspects of the transmitted scenario.

The instant embodiments more specifically relate to a call response system, which is comprised of three software-driven respectively electronically-interfaced telephony call-management modules; including a data-collection module (I) interfaced for sharing parameters with a dynamic-scripting module (II) which in turn is interfaced for sharing a scenario with a call-response module (III). Before presenting these modules in greater detail and before presenting some of their interesting variation embodiments, it seems appropriate to sketch out the core concept of the instant embodiments; so that the reader will appreciate that a novel combination is being presented that has no obvious equivalent in the complexly fragmented prior art. This core concept is the context within which one finds the distributed operational software protocol interfacing the modules and enabling them to perform their user friendly call-management functions.

It should be understood that in the context of the instant application, a call or an incoming call may consist of voice, instant messaging text (IM), chat, voice over chat, Email, video, or any other point to point communication modality. Moreover, the call response system of the instant application, responding to such an incoming call, can reside partially or in full in any telecommunications convergence device; namely in an intelligent communication device intended to receive an incoming call, such as a mobile (cellular) or land-line device; and in a communication manager intended to direct a call, such as a telephony switch (e.g. a PBX front end switch board or a telephony switch that has media cards to work with PSTN and VoIP infrastructures); or a VoIP server, WiFi; and the like.

It should further be understood that modules of the instant embodiments are typically software driven components. Thus, all mention of logic for performing an action relates to any combination of software and hardware that enable the doing of that action.

Now, for an incoming call to or through a telecommunications convergence device, if the call response system of the instant application is activated to potentially respond to such a call, then the data-collection module (I) automatically begins preparations to process the call. This means that instant call response system will be ready, in best real time quality, to accept an on-the-fly activation choice from the designated call recipient; or to automatically activate according to call recipient and/or system predetermined decision priorities.

The data-collection module (I) can be continuously working to anticipate the respective instant circumstance of call recipient user. For example, by monitoring the user's calendar, status, Facebook entries or other user's presence indicators, the data-collection module "knows" if the user is occupied; e.g. in a meeting, at lunch, traveling, on vacation, etc. Moreover, the data collection module (I) may establish a priority status according to registered "occupancy"; for example, by examining the roles or titles of the individuals on the invite message (in case of a meeting); or the roles or the titles of whom the user is currently engaged with in an ad-hoc discussion (over any communication modality); or by inspecting the associated priority status to a meeting invite, or some priority/urgency indication in the header/body of an Email that the user might have received which would indicate the reason for an ad-hoc discussion. Further, the user can establish a protocol to set the status of such a meeting or of any other occupancy; and as part of the response scenario set the priority and reason that the user is not available (as is described further below).

Similarly, the data collection module can decide that the user is absent from a scheduled event, for example, by identifying the user location to be distant from a scheduled event location using relevant real time data like location coordinates indicators, from a GPS application embedded in the user cellular phone, badge or car, that interfaces with the user's intelligent communication device, etc. As a further example, by obtaining relevant data from the Internet and comparing it to the current user's location, the system can conclude what is the appropriate voice land-line and/or facsimile machine and/or mobile-phone nearest to a meeting; and the like. Substantially simultaneously, the data-collection module (I) begins to collect and look for information about the caller; for example, getting caller ID, looking at area code or international dialing code, researching in user's contacts, searching reverse lookup database (e.g. caller's group), social network contacts in social network sites (e.g. LinkedIn and Facebook) and the like.

Quickly, the dynamic-scripting module (II) combines the most updated user data with the known caller data, and decides on an appropriate call response script, pre-written by or for the user; for example to play a voice message and record a message, to present a voice menu and accept a caller navigation, to forward the call elsewhere or the like. In order to actualize the chosen script, the dynamic-scripting module (II) personalizes the script; for example by selecting the appropriate voice message, and by inserting appropriate detail into that message (such as the anticipated user call-back time, or a suggested caller follow up call-back time, or an appropriate user name like "Mr. Smith" or "Jim" or "The Director", and the like.), and/or by sending an SMS, alert, alarm, or notice to the user or to his assistant, or the like. Thus, the script is selected and personalized. Often, text to speech conversion (synthesizing) is required to complete the preparation of dynamic parts of the script that are already chosen. It should thus be understood that a message can generally have different statuses such as a voice message, pre-recorded message, synthesized speech, an alert, alarm, a template sentence and the like.

Now, the call-response module (III) actually performs the scripted activity and also logs the entire structure and content of the call response event. The embodiment may further provide a mechanism to easily categorize each of the responses, logs, and to-do-lists so the user can easily find and prioritize what has to be done following the call. Additionally the embodiment may have logic to delete any logs that are very old (e.g. a month old) to save storage space. Further, logging enables initiating a feed-forward scheduling of follow-up activity which may include automatic reminder alerts, alarms, messaging and interruptions. For example a voice over coming onto the user's engaged call devise—saying "Your spouse called—5/10/15/etc.—minutes ago and is still waiting for your call-back"; or "your calendar says that you are in a meeting while your GPS says that you are still far from the location of that meeting—should I forward a configured voice message to the telephone for that meeting announcing your attendance delay as approximately in—5/10/15/infinite—minutes?"; or any other configurable script scenario that can be intelligently completed by the dynamic scripting module (II) using data that the data-collection module (I) of the user had access to and/or using data that can be "negotiated" with a data-collection module (I) of the caller, or the like.

Now more specifically, the data-collection module (I) has logic for collecting parameters of an incoming call and of a recipient for the incoming call. For practical purposes, these parameters allow integration with other applications, and facilitate collection of dynamic information for the dynamic scripting module (II). Such parameters, include, for example: Getting the caller ID from a contacts' list—such as cell phone number, home number, ANI, email address, chat ID and the like—depending on the modality of the communication; Getting the user presence information; Getting the user availability/schedule in the form of time indicators from the user's calendar; Getting the user location coordinates from the phone GPS module; Getting a users delegate presence status e.g. from presence server, to determine to whom to forward the call; and the like. The concept of embodiments of the data collection module can be broadened for collecting data from any incoming message regardless of the communication modality. The concept of data collection is to collect as much data as is available from the incoming call and then find as much as possible about the caller; within the available time. And at the same time, to obtain all current and valid information for the recipient of the call.

The dynamic-scripting module (II) has logic for configuring a response scenario according to prioritized combinations of the parameters and for substituting a component for at least one respective open variable within the configured scenario. By way of non-limiting examples, script templates may reflect having user interface and a simple scripting language to configure a predefined answer or a call scenario; executing a logic of what to do next with the incoming call based on at least one configured call scenario; collecting script dynamic information from the data collection module; interfacing with the call-response module (III) to respond with an answer to the incoming call and to further perform predetermined or template convolved actions needed; or the like.

The dynamic scripting module (II) can thus configure a response to an incoming call from script fragments by composing combinations of template actions. For example, a text message can be composed for sending back to the caller, either in the form of written text or in the form of voice, after synthesizing the text into speech; or the call may be forwarded to a third person, preceded or followed by appropriate messages to the caller and/or the original recipient of the call and/or the third person to whom the call is forwarded. For example, the call can be forwarded to a delegate the user has pre-defined which can assist in servicing a request even when the called party is not available. For example, a delegate to forward the call to can be pre-defined by name or selected by the application from a list of a meeting invite or based on pre-determined roles specified in a data base accessible to the data collection module (I).

In addition, the call-response module (III) has logic for transmitting aspects of the component substituted configured scenario and for recording aspects of the transmitted scenario. The regular man of the art will easily recognize these aspects from the following non-limiting examples: User configures whether the call is in a normal answer mode or in silent communication mode (namely under dominance of the call response system); If in silent communication mode: (A) Use one default scenario and interface with the script module to get the silent response, and/or (B) (If it has more than one option, then) prompt the user to choose one of the scripting module already configured scenarios/answers, and/or (C) Send a text answer from the scripting module to a text to speech synthesizer and transmit it. It is furthermore preferable that the module logs the call details and trigger follow up, if configured in the script module.

According to a first instant variation embodiment, the call-response module includes logic for transforming alphanumeric aspects into an equivalent synthesized speech (e.g. converts the text into voice). In this category is included the insertion of background and foreground sound effects, music, and the like. In other modalities of individual or combined call response a response may consist of drawings, video, pictures, art clips, etc.

According to a second instant variation embodiment, the call-response module includes logic for logging responses and initiating a predetermined follow-up event to the transmitted scenario. By this means, the call-response module may log answers and include a simple follow up event like a pop-up message or signal on the user phone screen or panel, reminding the user of an incoming call that has been responded by the system; and/or reminding the user of an action that should be taken (e.g. call back); or more sophisticated follow up as quasi-recursive instantiations; chaining or cascading into multiple autonomous telecommunications actions. Independent instantiations of a multitude of the instant systems sending dynamically scripted text to speech messages to one another might generate a potential cybernetic conversation between personality strategies of the respective systems' users. Simply stated, whole chains of conversations could occur between two users of the instant call response system. For example, the two users' systems could iteratively negotiate with each other, to find a mutual slot in their respective calendars; where the human to conversation could occur. Alternatively, if both users have put respective delay priority onto each other, then their systems could negotiate forever; since no slot could ever be mutually acceptable. If the mutual delay priority included callbacks, reminders, and other delaying protocol events, then the negotiations could actually begin to use significant system resources. Therefore, it is recommended that safeguards be instituted in the implemented system to limit the possibility of such unintended consequences.

According to a third instant variation embodiment, (A) the data collection module collects at least one parameter selected from the list: time of call, caller ID, caller group, ID of a recipient of the incoming call, time indicators of the recipient calendar, presence parameters, coordinates of physical location of the recipient, a delegate ID and a delegate presence parameter; and combinations thereof; (B) the dynamic scripting module includes at least one script fragment selected from the list: a pre-recorded message fragment, a text fragment, a menu, an option list, a sentence template, a pop-up message and a condition for matching of parameters; and combinations thereof; and (C) the call-response module includes at least one dynamic response selected from the list: a pre-recorded voice message, a text message, synthesized speech, a drawing, video, a picture, an art clip, a pop-up screen, call forward, recording the status of the call in a log and logging of responses; and combinations thereof.

Now, according to a further instant variation embodiment, the data collection module includes query-response access to at least one database providing at least one profile enhancement for a parameter selected from the list: an identifier of the initiator of the incoming call, an identifier of the recipient of the incoming call, and the like. For example, finding the callers personal details—like name, address, date of birth, etc., or finding the callers credit rating, on line profile, e.g. that can be used to tailor the response to the caller, etc. In this context, it is furthermore preferable that the call-response module has logic for transferring the call to the recipient at a profile enhancement provided address; for example, from a work phone to a mobile telephone, home telephone, SMS, email, etc. Now, according to a second preferred version of this third instant variation embodiment, the call-response module transmits the component substituted configured scenario to the incoming call; for example, to answer the caller back using the caller's name instead of "sir", or using the caller's location instead of "in your area", etc.

According to a fourth instant variation embodiment, at least one of the three respectively interfaced telephony modules is resident on a hardware entity selected from the list: (A) an intelligent communication device configured to receive an incoming call; (B) a communication manager configured to direct an incoming call. More specifically, the actual instantiations of the aforementioned modules may reside in whole or in part at an intelligent user device (e.g. a next generation personal communicator) and/or at any of many locations within telephony service provider infrastructure.

According to a further embodiment, a call response system is provided comprising three modules including a data-collection module, a dynamic-scripting module and a call-response module and further comprising a programming module configured and operable for (i) writing, editing and recording programming commands according to an interfacing with a user, and (ii) generating software or software parameters for at least one module of the response call system, from the programming commands.

The programming commands, optionally being part of a dedicated programming language embedded in the programming module, includes condition commands and action commands. Condition commands can include for example "If" commands, employed for matching for example data collected by the data collection module, with pre-defined parameters set by the user. Action commands can then be executed upon finding a match—or not finding such a match—of the data with the parameters. As an example, the user can use the programming commands to program the system to respond with a specific action—for example, a static response message transmitted to the caller—if the caller ID matches one particular entry in the user's contact list in the user's phone.

The programming commands can further include commands for building menus by the user, to be used at the appropriate occasion. Thus, for example, an action performed when a condition is matched may be the display on the user's phone screen of a set of possibilities in the form of a menu, such that the user may be able to choose an option from the list in a click (or a few clicks) of a button. Such a choice can then be followed by an additional set of actions performed by the system without any further intervention of the user. More complex examples can include programming the system to attempt to find matches to a set of multiple conditions or to perform several actions rather than just one, or to perform combinations of conditions and actions, or conditions, actions and user-selected options.

According to yet a further variation embodiment, a call response method is provided, comprising the steps of (A) collecting parameters of an incoming call and of a recipient for the incoming call; (B) configuring a response scenario according to prioritized combinations of the parameters; (C) substituting a component for at least one respective open variable within the configured scenario; (D) transmitting aspects of the component substituted configured scenario; and (E) recording aspects of the transmitted scenario.

BRIEF DESCRIPTION OF THE DRAWINGS

Illustrative embodiments will now be described, by way of non-limiting example only, with reference to the accompanying drawing. Furthermore, a more complete understanding of the present embodiments and the advantages thereof may be acquired by referring to the following description in consideration of the accompanying drawings, wherein.

DETAILED DESCRIPTION OF THE EMBODIMENTS

Figure 1:
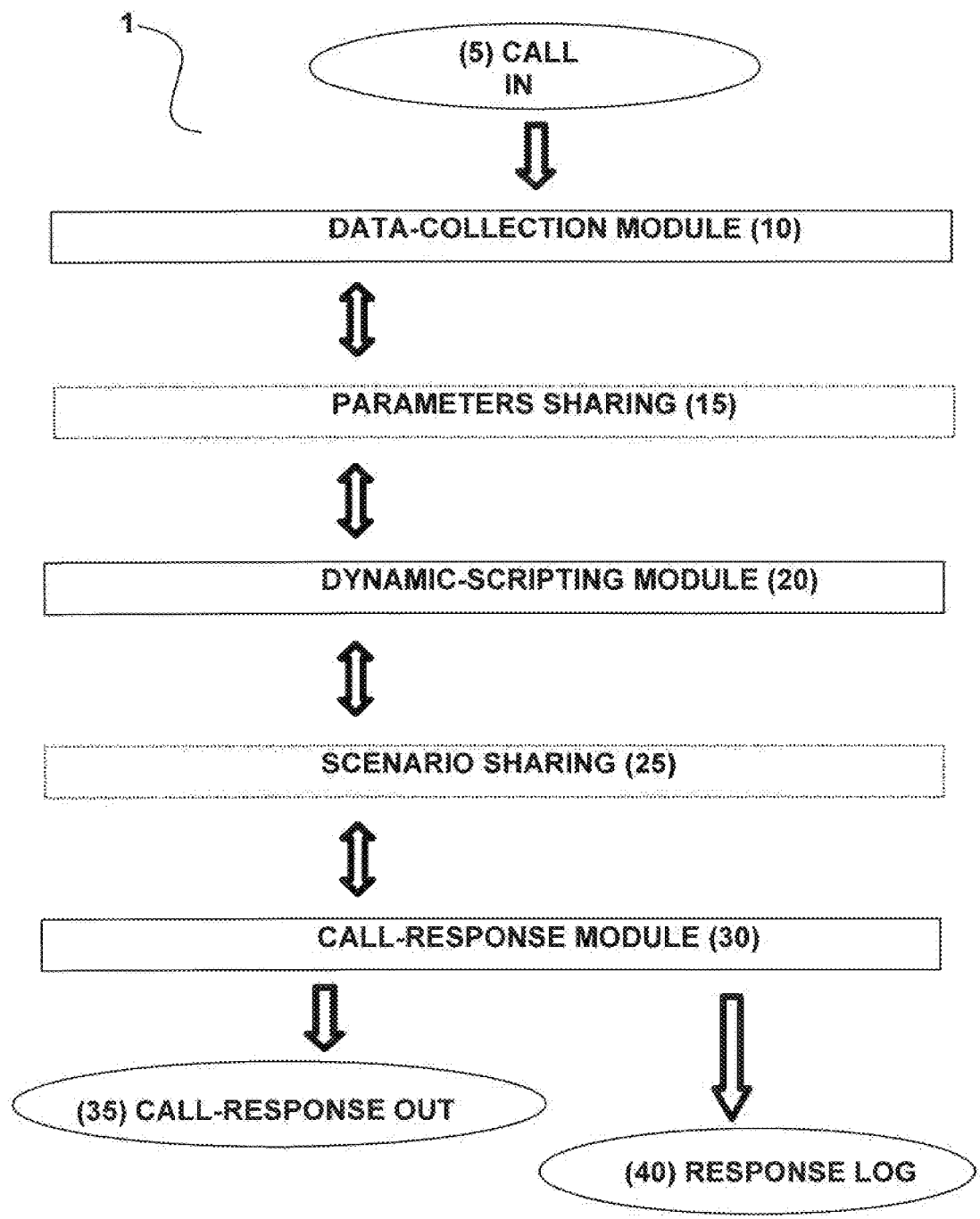
FIG. 1 is a schematic view of a regular instant call response system.

The instant embodiments may be realized and employed in various forms, wherein a typical embodiment (see FIG. 1) relates to A Call Response System comprising three software-driven respectively electronically-interfaced telephony call-management modules including a data-collection module (10) interfaced for sharing parameters (15) with a dynamic-scripting module (20) which in turn is interfaced for sharing a scenario (25) with a call-response module (30), wherein (A) the data-collection module has logic for collecting parameters (i) of an incoming call (5) and (ii) of a recipient for the incoming call; (B) the dynamic-scripting module has logic (i) for configuring a response scenario according to prioritized combinations of the parameters and (ii) for substituting a component for at least one respective open variable within the configured scenario; and (C) the call-response module has logic (i) for transmitting aspects (35) of the component substituted configured scenario and (ii) for recording aspects (40) of the transmitted scenario.

In the ordinary world, particularly where "Business Enablement" strongly benefits from "intelligent communication", there are many times when an individual receives a call from an identified caller, that individual can not pick up the call but has need to send a short message to the caller or to have performed some other short action. For example, the individual is in the middle of another call and wants to notify the caller that the incoming call is noted and acknowledged with some "I will get back to you as soon as I finish another call" message; or the individual is in the middle of a meeting and receives a silent incoming call notification from a caller and the individual knows that his delegate/colleague could assist immediately—requiring the individual to forward that call to the appropriate delegate/colleague; or the individual is in the middle of a meeting while a colleague calls but can not be answered. Accordingly, the system has the option to embody sending a predefined message stating that "I am in the middle of a meeting and only if it is an urgent case will I leave the meeting to call you back"; or the like. More particularly, it is very important that alternate answering modes are facilitated with minimal distraction to the user, so the user can concentrate on the call or meeting that the user is currently participating in. In particular, the user should not have to put a current call on hold to perform the call-handling operation.

Furthermore, the instant embodiments enable the user to send back messages to a caller; when the user can't pick up the call, or to transfer the call to another extension without actually answering it. These embodiments enable the messages to be quickly available to the user with minimal disruption to the task the user is currently performing. Particularly, this handling is possible without the need to put a currently active call on hold. Also, answers are logged to keep track of the responses with the ability to follow up and/or set a reminder.

Various instant embodiments enable the user with built in predefined responses; such as according to the following scenarios:

Scenario One: Answer a call with pre-defined recorded answers in the user's voice. In this example the data collection module (10) may collect values of parameters of the incoming call such as time of call, the caller ID or group the caller belongs to, as well as additional parameters of the recipient such as the presence status of the user (in a meeting, in the middle of another call, etc.). Such data are passed to the dynamic scripting module (20) that, upon these data and optionally additional data, configures a response scenario according to prioritized combinations of the parameters. According to the instant embodiment, the pre-recorded messages function as components to be substituted in appropriate open variables of the scenario to be transmitted. In other words, the dynamic scripting module may select a specific recoded message according to the data associated with the caller and the recipient. The selected message is then transmitted back to the caller by the call response module (30), which also records the event of the incoming call and the selected message that was transmitted back in the logger. Optionally, the call response module (30) may initiate also a follow-up/reminder to the user, e.g. a pop-up notice of a pre-determined message. The time for such a reminder to show up may also be set up in advance by the user as an open variable, to be for example a pre-determined period after the original call, or at a pre-determined hour, or at a time slot taken from the user calendar embedded in the user's phone etc.

It should be noted that predefined recorded messages can be provided in numerous ways: for example, by recording the message in the user voice, thus making the answer static, i.e. without variables. As another example, a text to speech synthesizer may be employed, by which the user can dynamically generate a message by combining fixed text with variables that are selected or determined in real time, according to the parameters of the call collected by the data collection module (10). Such variables could for example reflect "states" of the user—for example "on another call", "out of the office", "in a meeting", "unavailable" etc. Another example of a variable might be the caller's name (assuming the caller is in the user's phone contacts list). As yet another example, a dynamic variable component may be obtained from applications that operate on the intelligent communications device, on an adjunct or which interact with the intelligent communications device. For example, a component for a variable may be the physical location coordinates of the user, obtained from a GPS application embedded in a cellular phone device of the user. Thus, according to this example, a configured response to a caller who is identified for example as a person having a planed meeting with the user in short while (as may be obtained from the user's calendar application), will receive a message saying for example that the recipient is driving and is a given distance, or a given time, from the meeting location or start time.

Employment of such variables would allow the user to compose a dynamic message, which will be configured in its final form by the dynamic scripting module (20) upon handling a specific call, and using the appropriate components specific to the call, after being provided by the data collection module (10). Thus, for example, a template sentence like: "Hello <caller-name>. I'm sorry I can't speak with you right now, as I am currently <my-presence>. I will call you back at <free-time>" may be transmitted to the caller as "Hello John Smith. I'm sorry I can't speak with you right now, as I am currently in a meeting. I will call you back at four PM". The <free-time> can be taken from the phone calendar, if the phone is synced with a calendar application such as, for example, Outlook schedule. <my-state> is updated by the user if not taken from his calendar or from the phone status. Then the response is logged by the call response module so that the user can follow-up as necessary. In fact, the logged responses may be tracked, stored for historical purposes, or analyzed for purpose of improving or establishing a relationship with a calling party as in the case in a call center environment, in a sales environment, etc.

Scenario Two: A user that can't answer a call (e.g. being busy in a meeting) will be able to signal this condition to the caller and ask him to indicate back the priority of the call. According to this scenario the data collection module (10) will collect data associated with the call, the caller and the recipient, as previously described, and the dynamic scripting module (20) will configure a message to the caller, acknowledging the status of the intended recipient of the call, and asking the caller to indicate, e.g. by pressing one of two keys on the caller's phone, the priority of the call. Upon receiving the indication of the caller by the data collection module (10) and passing it on to the dynamic scripting module (20), the dynamic scripting module will configure a response depending on the content of the indication. If the indication means that the call is of low priority the call will terminate and its details would be logged by the call response module (30), optionally followed by a follow up scenario in the form of an, e.g. pop up notice to the user, as previously described. Alternatively, if the indication means that the call is of high priority the dynamic scripting module will configure a response—to be activated by the call response module (30)—essentially allowing the recipient of the call to take the call.

Scenario Three: Forwarding an incoming call to a delegate or colleague with messages to calling party and the forwarded party that this call was rerouted (by the designated call-recipient) to the new destination. According to this scenario, the user pre-determines a group of callers that, in cases that the user is unavailable to take a call, their call would be forwarded to a third person. Thus, upon receiving a call from e.g. such an identified caller belonging to that group, and upon collecting the relevant data and identifying the caller by the data collection module (10), the dynamic response configured by the dynamic response module (20) includes for example configuring a message to the caller, acknowledging of the expected forwarding of the call and configuring the forwarding itself. Then the call response module transmits the message back to the caller, activates the forwarding of the call and generates a log as well as a follow up message to the user, indicating of the activity that has been performed, as is previously described.

Scenario four: According to this scenario the response to an incoming call is not all-automatic, and the user is provided with e.g. a pre-selected list of alternative possible responses to choose from for example, by clicking a button, or highlighting a selection, etc. Thus, upon receiving a call and selecting this scenario by the dynamic scripting module, the call response module generates for example a short message and a list of actions to be presented on the user's phone screen. The user can then choose the preferred response from the list, or to forward the call to the delegate, and this response will consequently be executed and logged by the call response module (30). It should be understood that this scenario provides the user with higher flexibility of choosing the desired or preferred response on the spot, thus eliminating the need to define in advance the exact response to any event namely any type of call in any type of situation; albeit combined with the principle of minimum interference required from the user, according to the described embodiments.

Figure 2:
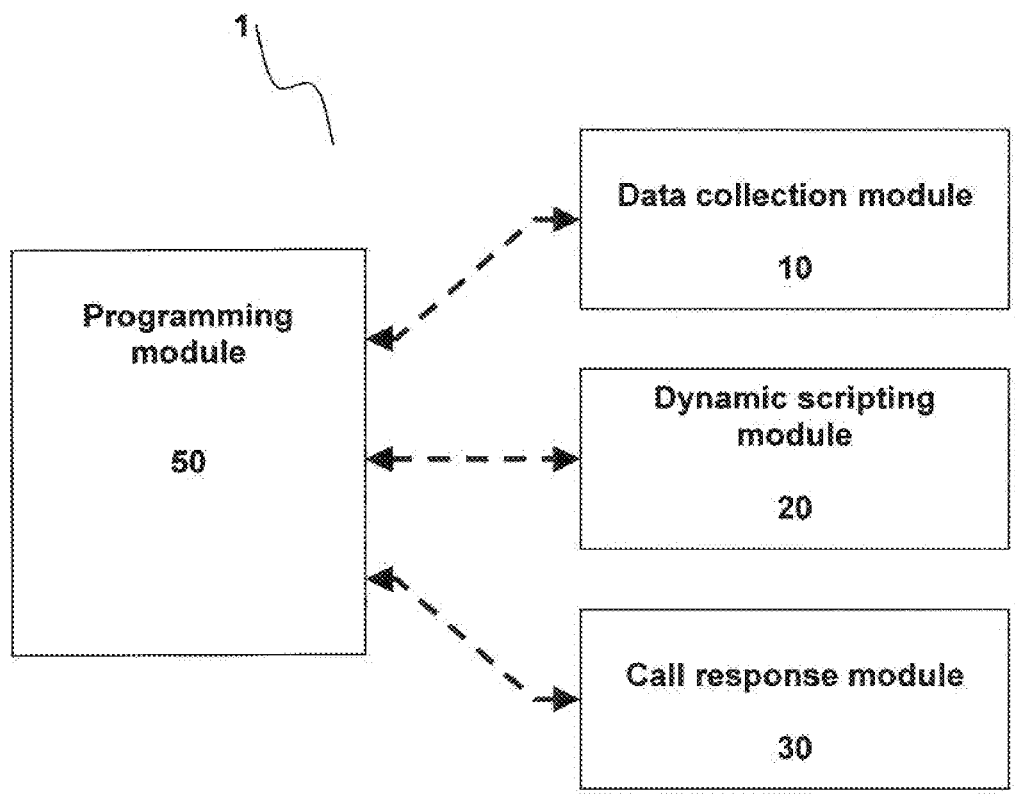
FIG. 2 is a schematic view of a call response system, including a programming module.

FIG. 2, to which reference is now made, shows a call response system comprising three software-driven respectively electronically-interfaced telephony call-management modules including a data collection module (10), a dynamic scripting module (20) and a call response module (30) and further comprising a programming module (50). It should be understood that the modules could also be implemented in firmware, PLDs (programmed logic devices), and hardware. The programming module has logic for (i) interfacing with a user for writing, editing and recording programming commands, and (ii) for generating software parameters from said programming commands for the three software-driven modules, namely the data collection module (10), the dynamic scripting module (20) and the call response module.

The programming module has logic for interfacing with a user for writing and editing programming commands, where actual employment of such an interface can be for example a set of keys (buttons) and a screen of a phone device; or a touch screen of the phone device employed both as a virtual keyboard (for input) and a visual output screen; or by connection to another device e.g. a lap-top or a desk-top or any other computer, thereby interfacing with a user. The programming module further comprises logic for recording programming commands, for which end it can interface for example with a memory module incorporated in the phone device, for example an on-chip memory embedded in the phone, or a SIM card or a flash memory or another type of memory unit.

The programming module (50) has further logic for generating software parameters from the programming commands for the three software-driven modules (10, 20, and 30). The programming module (50) is thus configured for interfacing with at least one of the modules (10, 20, and 30) for sending and receiving data and particularly for downloading software, or software parameters, to at least one of the three modules (10, and 30), according to the programming commands that were written by the user.

It should be noted that the construction of scripts and menus by the user, by writing and editing programming commands and employing the programming module as described above, is generally entirely disconnected from the activity of call handling by the call response system as was described in detail with reference to FIG. 1. Thus, in the course of construction of such scripts and menus by the user, the call response system should be considered as being in a mode of operation which is generally different and independent from any mode of operation involved in the actual real-time handling of an incoming call. Simply stated, at least part of the logic of the three modules (10, 20 and 30) should typically be established by the user, employing the programming module as described in FIG. 2, in order to enable the three modules to be operative as components of the call response system as described in connection to FIG. 1.

Now, in addition, the instant embodiments also enable the user to forward a call without answering it; enable the user with very few clicks or actuations to take the action; log the action taken and set reminder to specific scenarios; provide a text to speech capability to compose dynamic messages incorporating variables that get updated in real time; and the like. Furthermore, instant embodiments provide a user with an ability to very quickly send back message or reroute the call, most particularly with the important ability to log the action and therewith to follow them up; automatically or when the user is available. Furthermore, these embodiments enable the user to write the scenario scripts and personalize the response to the different scenarios.

It should be understood that the scenarios described above are provided only as non-limiting examples to various utilization modes and embodiments, and in no way do they exploit the spectrum of scenarios, cases and examples in which the instant embodiments can be utilized and advantageous. While the embodiments and modes of operation have been described with respect to specific examples, those skilled in the art will appreciate that there are numerous variations and permutations of the instant "Call Response System" described modules, techniques, methods, and apparatus—that fall within the spirit and scope of the embodiments as set forth in the appended claims.

Finally, please note that numbers, alphabetic characters, and roman symbols designated herein are for convenience of explanations only, and should by no means be regarded as imposing particular order on any implicit or explicit method steps.

I claim:

1. A Call Response System comprising:
   (A) a data-collection module for collecting parameters
       (i) of an incoming call and
       (ii) of a recipient for the incoming call;
   (B) electronically interfaced to the data-collection module, a dynamic-scripting module for:
       (i) electronically configuring a response scenario according to prioritized combinations of the parameters to obtain a configured scenario and
       (ii) substituting a component for at least one respective open variable within the configured scenario; and
   (C) electronically interfaced to the dynamic-scripting module, a call-response module for:
       (i) transmitting aspects of the component substituted configured scenario to obtain a transmitted scenario and
       (ii) recording aspects of the transmitted scenario,
   wherein the data-collection module, the dynamic-scripting module, and the call-response module are software driven components, and wherein no user interaction occurs during the configuring the response scenario and the substituting the component; and
   (D) a programming module configured and operable for:
       (i) writing, editing and recording programming commands according to an interfacing with a user; and
       (ii) from said programming commands, generating software parameters for at least one module of the Call Response System.

2. The Call Response System according to claim 1 wherein the call-response module includes logic for transforming alphanumeric aspects into an equivalent synthesized speech.

3. The Call Response System according to claim 1 wherein the call-response module includes logic for logging responses and initiating a predetermined follow-up event to the transmitted scenario.

4. The Call Response System according to claim 1 wherein
(A) the data-collection module collects at least one parameter selected from the list: time of call, caller ID, caller group, ID of a recipient of the incoming call, time indicators of the recipient calendar, presence parameters, coordinates of physical location of the recipient, a delegate ID, a delegate presence parameter, and combinations thereof; and
(B) the dynamic-scripting module includes at least one script fragment selected from the list: a pre-recorded message fragment, a text fragment, a menu, an option list, a caller navigation, a sentence template, a pop-up message, a condition for matching of parameters, and combinations thereof and
(C) the call-response module includes at least one dynamic response selected from the list: a pre-recorded voice message, a text message, synthesized speech, a drawing, a video, a picture, an art clip, a pop-up screen, a call forward, a recording of status of the call in a log, a logging of responses, and a combination thereof.

5. The Call Response System according to claim 1 wherein the data collection module includes query-response access to at least one database providing at least one profile enhancement for a parameter selected from the list: an identifier of the initiator of the incoming call, and an identifier of the recipient of the incoming call.

6. The Call Response System according to claim 5 wherein the call-response module transfers the incoming call to the recipient at a profile enhancement provided address.

7. The Call Response System according to claim 4 wherein the call-response module transmits a component substituted configured scenario to the incoming call.

8. The Call Response System according to claim 1 wherein at least one of the data-collection module, the dynamic-scripting module, and the call-response module is resident on a hardware entity selected from the list: (A) an intelligent communication device configured to receive an incoming call; and (B) a communication manager configured to direct the incoming call.

9. The Call Response System according to claim 1 wherein no user interaction occurs from the time of the incoming call until the recording aspects of the transmitted scenario.

10. The Call Response System according to claim 1 wherein the data-collection module monitors a user status and adjusts the response scenario based on the user status, wherein the user status is not related to the incoming call, and wherein the monitoring the user status is performed using only real-time information that is monitored electronically and is not pre-programmed into a database.

11. The Call Response System according to claim 1 wherein the data-collection module establishes a priority status based on a presence status of a user.

12. The Call Response System according to claim 11 wherein the presence status of the user is determined from a social media presence indicator.

13. A Call Response System comprising:
(A) a data-collection module for collecting parameters
   (iii) of an incoming call and
   (iv) of a recipient for the incoming call;
(B) electronically interfaced to the data-collection module, a dynamic-scripting module for:
   (iii) electronically configuring a response scenario according to prioritized combinations of the parameters to obtain a configured scenario and
   (iv) substituting a component for at least one respective open variable within the configured scenario; and
(C) electronically interfaced to the dynamic-scripting module, a call-response module for:
   (iii) transmitting aspects of the component substituted configured scenario to obtain a transmitted scenario and
   (iv) recording aspects of the transmitted scenario,
wherein the data-collection module, the dynamic-scripting module, and the call-response module are software driven components, and wherein no user interaction occurs during the configuring the response scenario and the substituting the component; and
wherein the collecting parameters is done substantially simultaneously as the electronically configuring and without reference to a database pre-programmed by a user.

14. The Call Response System according to claim 1 wherein no user interaction occurs from the time of the incoming call until the recording aspects of the transmitted scenario such that all of the collecting parameters, the electronically configuring, the substituting the component, and the transmitting aspects of the component substituted configured scenario are completed electronically.

15. The Call Response System according to claim 10 wherein the monitoring the user status includes a comparison of information set by the user to the information that is monitored electronically.

16. The Call Response System according to claim 1 wherein the data-collection module establishes a priority status based on a presence status of a user that is real-time data obtained electronically and is not pre-programmed in a database by the user.

17. The Call Response System according to claim 16 wherein the presence status of the user is determined from a social network site presence indicator.

* * * * *